United States Patent
Bachia et al.

(10) Patent No.: US 10,216,191 B1
(45) Date of Patent: Feb. 26, 2019

(54) PROPERTY HUNTING IN AN AUTONOMOUS VEHICLE

(71) Applicant: Wells Fargo Bank, N.A., San Francisco, CA (US)

(72) Inventors: George Muthui Bachia, Helena, AL (US); Daniel Jerome Clifford, Minneapolis, MN (US); Haven Brock Kolls, Alpharetta, GA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 108 days.

(21) Appl. No.: 15/621,379

(22) Filed: Jun. 13, 2017

(51) Int. Cl.
| | |
|---|---|
| *G05D 1/00* | (2006.01) |
| *G05D 3/00* | (2006.01) |
| *G06F 17/00* | (2006.01) |
| *G05D 1/02* | (2006.01) |
| *H04N 21/258* | (2011.01) |
| *H04R 29/00* | (2006.01) |
| *H04L 29/08* | (2006.01) |

(52) U.S. Cl.
CPC ......... *G05D 1/0223* (2013.01); *H04L 67/306* (2013.01); *H04N 21/25841* (2013.01); *H04R 29/008* (2013.01); *B60K 2350/1004* (2013.01)

(58) Field of Classification Search
CPC ................ G05D 1/0223; H04L 67/306; H04N 21/25841; H04R 29/008; B60K 2350/1004
See application file for complete search history.

(56) References Cited

U.S. PATENT DOCUMENTS

| | | | |
|---|---|---|---|
| 6,636,803 B1 * | 10/2003 | Hartz, Jr. | G06Q 10/10 701/454 |
| 7,599,795 B1 | 10/2009 | Blumberg et al. | |
| 7,840,427 B2 | 11/2010 | O'Sullivan | |
| 8,346,796 B2 | 1/2013 | Kardell | |
| 8,688,594 B2 * | 4/2014 | Thomas | G06Q 50/16 705/314 |
| 8,896,485 B2 * | 11/2014 | Mendelson | G01O 21/206 342/463 |
| 8,965,460 B1 | 2/2015 | Rao et al. | |
| 9,002,754 B2 | 4/2015 | Abhyanker | |
| 2003/0064705 A1 * | 4/2003 | Desiderio | G06Q 30/06 455/412.1 |
| 2004/0021584 A1 * | 2/2004 | Hartz, Jr. | G06Q 10/10 701/532 |

(Continued)

OTHER PUBLICATIONS

O'Brien, "How Self-Driving Cars Are Changing up the Game in the Real Estate Industry," O'Brien Real Estate, http://www.obrienrealestate.com.au/self-driving-cars-changing-game-real-estate-industry/, 2016, 2 pages.

(Continued)

*Primary Examiner* — Mussa A Shaawat
(74) *Attorney, Agent, or Firm* — Merchant & Gould P.C.

(57) ABSTRACT

A method implemented in an autonomous vehicle (AV) for facilitating house hunting using the AV, includes displaying on a display screen of the AV, a listing of one or more houses for sale in a specific geographical area. A selection is received of one or more houses from the listing of the one or more houses. A route is identified from a current geolocation of the AV to a geolocation of each of the one or more houses selected. The AV is automatically directed to drive to the geolocation of a first house on the route.

14 Claims, 7 Drawing Sheets

(56) References Cited

U.S. PATENT DOCUMENTS

| | | | |
|---|---|---|---|
| 2016/0047662 A1 | 2/2016 | Ricci | |
| 2016/0210775 A1* | 7/2016 | Alaniz | G05D 1/0088 |
| 2016/0358247 A1 | 12/2016 | Majumdar | |
| 2017/0329329 A1* | 11/2017 | Kamhi | B60W 50/14 |
| 2018/0017968 A1* | 1/2018 | Zhu | B60W 50/08 |
| 2018/0136652 A1* | 5/2018 | Jiang | G05D 1/0088 |
| 2018/0143647 A1* | 5/2018 | Wang | G05D 1/0088 |
| 2018/0183873 A1* | 6/2018 | Wang | H04L 67/12 |
| 2018/0211414 A1* | 7/2018 | Cronin | B60K 35/00 |

OTHER PUBLICATIONS

Eisenstein, "New Fleet Lets You Focus on Clients in the Car," http://realtormag.realtor.org/technology/feature/article/2016/11/new-fleet-lets-you-focus-clients-in-car, Realtor Mag, Nov. 2016, 3 pages.
Newstar, "Tech Trends That'll Change Showings," http://blog.newstarrealty.com/index.php/2016/04/21/tech-trends-thatll-change-showings/, Newstar Realty & Inv., Apr. 21, 2016, 60 pages.

\* cited by examiner

PROPERTY HUNTING IN AN AUTONOMOUS VEHICLE

BACKGROUND

An autonomous vehicle is a self-driving vehicle that can operate with little or no human control of the vehicle. A variety of techniques can be used to detect the surroundings of and navigate the autonomous vehicle. Techniques used to detect the surroundings of the autonomous vehicle can include radar, global positioning system (GPS) and computer vision. Advanced control systems can be used to interpret sensory data and to help navigate the autonomous vehicle.

SUMMARY

Embodiments of the disclosure are directed to a method implemented in an autonomous vehicle (AV) for facilitating house hunting using the AV, comprising: displaying on a display screen of the AV, a listing of one or more houses for sale in a specific geographical area; receiving a selection of one or more houses from the listing of the one or more houses; identifying a route from a current geolocation of the AV to a geolocation of each of the one or more houses selected; and automatically directing the AV to drive to the geolocation of a first house on the route.

In another aspect, a method for using an AV comprises: displaying on a window of the AV, a listing of houses in a specific geographical area available for sale; receiving a selection of one or more houses from the listing of houses; identifying an optimized route from a current geolocation of the AV to a geolocation of each of the one or more houses selected; automatically directing the AV to drive to the geolocation of a first house on the optimized route; and after reaching the geolocation of the first house, upon a command of an individual in the AV, directing the AV to drive to the geolocation of a second house that is next on the optimized route.

In yet another aspect, an electronic computing device comprises: a processing unit; and system memory, the system memory including instructions which, when executed by the processing unit, cause the electronic computing device to: display on a display screen of the AV, a listing of houses in a specific geographical area available for sale, the display screen being implemented on one or more windows of the AV; receive information identifying one or more houses on the listing of houses for which an individual is prequalified to purchase; display on the display screen of the AV, an icon adjacent to each of the one or more houses on the listing of houses for which the individual is prequalified to purchase; receive a selection of one or more houses on the listing of houses for which the individual is prequalified to purchase; identify an optimized route from a current geolocation of the AV to a geolocation of each of the one or more houses selected, the optimized route being a route that is a shortest route to the one or more houses selected or a route that that is a fastest route to the one or more houses selected; automatically direct the AV to drive to the geolocation of a first house on the optimized route; as the AV is driving to the geolocation of the first house, display on the display screen of the AV one or more of 1) information regarding noise levels along the optimized route, 2) information regarding crime in a neighborhood along the optimized route, 3) information regarding schools in the neighborhood along the optimized route, 4) information regarding transportation in the neighborhood along the optimized route and 5) information regarding shopping in the neighborhood along the optimized route; and when the AV reaches the geolocation of the first house: display on the display screen of the AV a view of an interior of the first house; display on the display screen of the AV a current price of the first house, a current market value of the first house and a current annual property tax for the first house; and display on the display screen of the AV an estimated monthly mortgage, insurance and property tax payment for the first house.

The details of one or more techniques are set forth in the accompanying drawings and the description below. Other features, objects, and advantages of these techniques will be apparent from the description, drawings, and claims.

DETAILED DESCRIPTION

The present disclosure is directed to systems and methods for implementing house hunting using an autonomous vehicle (AV). Using the systems and methods houses that can be pre-approved for an individual to purchase can be displayed to the individual. The individual can then select one or more of the houses to visit, an optimal route using the AV can be determined and the AV can transport the individual to each house on the optimal route.

In an example implementation, the individual can set up preferences for houses that the individual would like to purchase. The preferences can include such items as a type of house (e.g. colonial, cape cod, ranch, etc.), a price range for the house, and one or more neighborhoods for the house. The individual can also provide financial information, such as current income, current employer, spouse's income and employer, credit history, etc. The preferences and financial information can be used to select houses for which the individual may be interested in purchasing and for prequalifying the individual for those houses.

The proposed houses for purchase can be presented to the individual on an electronic computing device of the individual, for example on a desktop or laptop computer or on a mobile electronic device such as a smart phone. In some implementations, the proposed houses can be displayed on a display device in the AV when the individual is in the AV. In some implementations, the display device can be implemented on one or more windows of the AV. When implemented on the one or more windows of the AV, the individual can hand scroll up and down or side to side on one of the windows to select a house to view.

The display on the one more windows of the AV can be an augmented reality display that can augment a scene viewed through the one or more windows. For example, as discussed in more detail later herein, when the AV passes a house, a current price of the house can be projected in augmented reality on a window of the AV as the individual views the house through the window of the AV.

Other images can also be projected on the one or more windows of the AV. For example, when the AV arrives at a specific house, images of interior rooms of the specific house can be projected on the one or more windows of the AV at the same time as the individual views the exterior of the house through one of the windows of the AV. In addition, images of different houses, for example of the houses the individual as selected to view, can be projected on the one or more windows of the AV.

Once the individual has selected the houses to view, the AV can be programmed to transport the individual to a first house on the optimal route. In some implementations, when the AV arrives at the first house on the optimal route, additional information can be displayed to the user. The additional information can include items such as prices of houses near the first house on the optimal route, information regarding the neighborhood in which the first house is located, information regarding schools, crime, parks, transportation, noise levels and other information regarding the first house on the optimal route. This information can be displayed on the display device of the AV, which can include the one or more windows of the AV.

The additional information can also include photos from the inside of the first house on the route. A current owner of the first house can provide the photos to a website than can be accessed by the individual. For example, the website can be associated with a realtor that is working with the current owner to sell the house. In some implementations, a drone device can be provided with the AV, for example mounted on top of the AV, can be used to take photos of the roof of the first house. The photos of the roof can be displayed on the display device in the AV.

When the individual has completed viewing the first house, the individual can instruct the AV to drive the AV to a location of a second house on the optimal route. In some implementations, the individual can use a voice command to direct the AV to drive to the second house. In other implementations, the individual enter a command onto the display device (which can have touch screen capability) or onto the individual's smart phone or other mobile electronic computing device.

In this disclosure, the individual is a customer of an organization that can arrange a house hunting trip for the individual using an AV. In an example implementation, the organization can be a realty company that can maintain a profile of the individual, that can obtain personal information regarding the user from a third party organization, such as a financial institution where the individual can have one or more financial accounts and that provide an AV to the user during the trip. For example, the realty company can maintain one or more AVs that can be customized to include a display screen and that have the display screen incorporated into one or more windows of the AV. In another example implementation, the organization can be a ride sharing company that includes customized AVs and that has a business relationship with the realty company and the financial institution. In still another example implementation, the organization can be the financial institution; the financial institution can have a business relationship with the realty company and a third party company that can provide customized AVs. Implementations using other types of organizations are possible.

The systems and methods disclosed herein are directed to a computer technology that can automatically compile a list of houses that an individual may be interested in purchasing and that can automatically prequalify the individual to purchase one or more the houses. In addition, the computer technology can automatically generate an optimal route for an AV that can pick up the individual and efficiently drive the individual to each house in the list of houses. The computer technology can also provide different types of information to the user regarding the houses on the list of houses and the neighborhood in which the houses are located. The information can also be displayed on one or more windows of the AV, permitting the individual to view the neighborhood through the window at the same time as information regarding the houses and the neighborhood are projected on a window of the AV. Although the systems and method in this disclosure are described with respect to house hunting, the systems and methods can also be applied to other types of property, for example land that does not include an existing structure or land that includes a commercial building.

Figure 1:
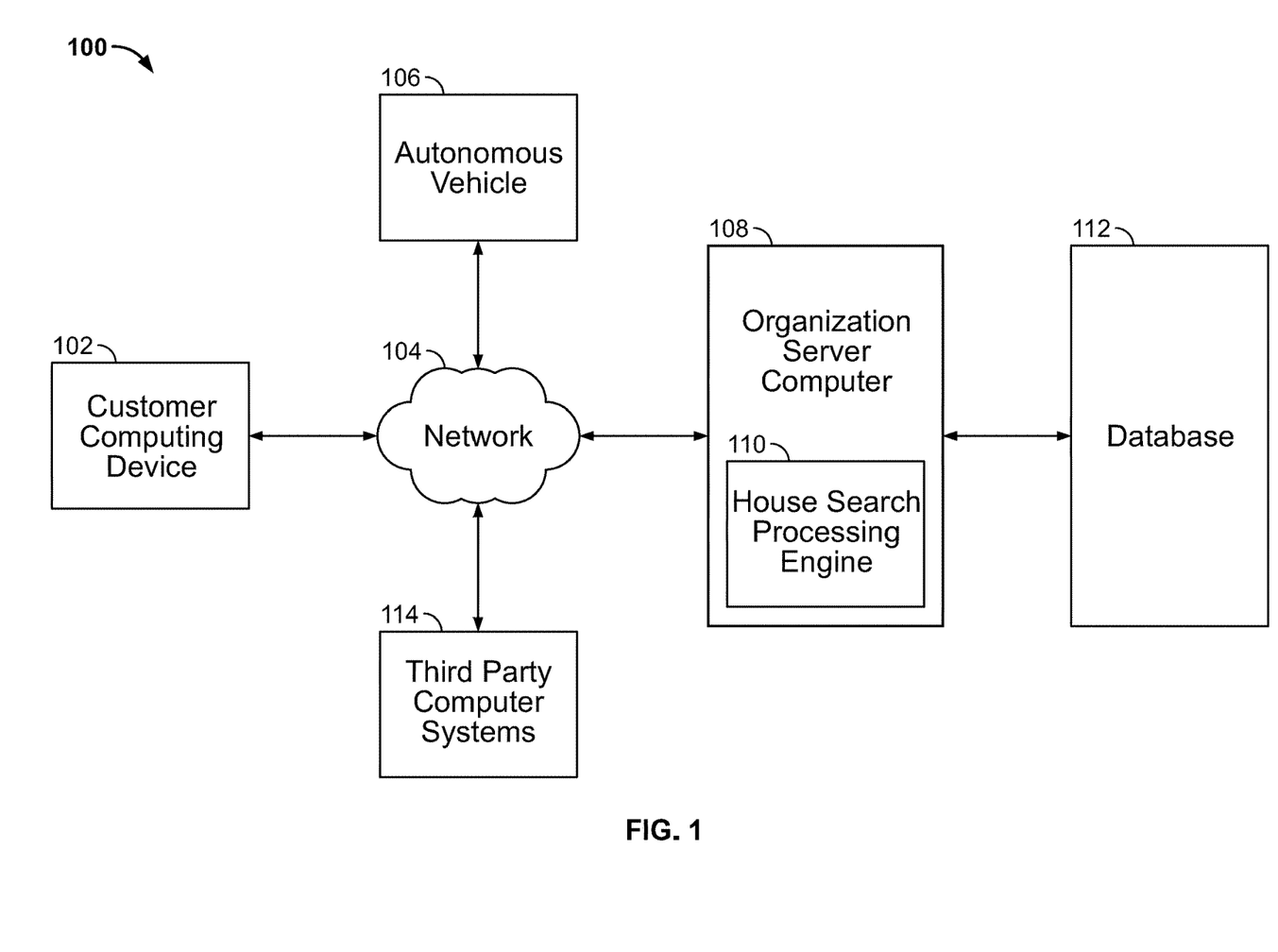
FIG. 1 shows an example system that supports house hunting in an autonomous vehicle.

FIG. 1 shows an example system 100 that can support house hunting in an AV. System 100 includes a customer computing device 102, a network 104, an autonomous vehicle 106, an organization server computer 108, a database 112 and third party computer systems 114. Organization server computer 108 includes a house search processing engine 110. More, fewer or different components can be used.

The example customer computing device 102 is an electronic computing device of a user who is a customer of an organization associated with organization server computer 108. The electronic computing device can be a desktop computer, a laptop computer, a smartphone or a tablet computer. More than one customer computing device 102 can be used.

The example network 104 is a computer network such as the Internet. Customer computing device 102 can wirelessly connect to or otherwise access organization server computer 108 via network 104.

The example autonomous vehicle 106 is a self-driving vehicle that can be used by the customer. Autonomous vehicle 106 includes electronics that permits communication between autonomous vehicle 106 and organization server computer 108 over network 104. The electronics can direct the AV to houses on the optimal route based on commands received from organization server computer 108 and based on a customer selection of a house on a touch screen display device in the AV.

The example organization server computer 108 is a server computer of an organization that can arrange a house hunting trip for the customer using the AV. For example, the organization can be a realty company that can arrange the house hunting trip and that can provide the AV to the customer during the trip. Other types of organizations are possible.

The example house search processing engine 110 can identify houses that the customer may be interested in purchasing. The house search processing engine 110 can also use profile and other personal information regarding the user, for example financial information, to prequalify the customer to purchases one or more of the identified houses. The house search processing engine 110 can also identify a route for the AV from a current location of the customer to each of the identified houses. Other functionality for the house search processing engine 110 can include providing supplemental information regarding the identified houses, interfacing with a display screen on the AV and operating the AV. The supplemental information can include such items as a noise level in a neighborhood where a house is located, a safety assessment of the neighborhood, including an assessment of crime and an assessment of potentially dangerous close-by utilities such as pipelines, prices of other houses in the neighborhood, future growth rate and plans for the neighborhood, and other information. The house search processing engine 110 is described in more detail later herein.

The example database 112 is a database associated with the organization. Profile information for the customer can be stored in database 112. In addition, if the organization is a financial institution, financial and personal information for the customer can also be stored in database 112. In addition, if the organization is a realty company, database 112 can include information regarding current houses for sale. Database 112 can be distributed over a plurality of databases. For example, one database 112 can store the financial and personal information for the customer and another database 112 can include information regarding current houses for sale. The house search processing engine 110 can be programmed to query (e.g. using SQL) database 112 to obtain profile information and route information for a best fit of homes to search for the customer and to create an optimal travel route to those homes. Various profile information, house information and route information can be stored in and retrieved from database 112.

The example third party computer systems 114 are computer systems of third party organization that can provide personal information about the customer to organization server computer 108. An example third party computer system 114 is a server computer of a financial institution, such as a bank, at which the user can have one or more financial accounts. The financial institution can include a profile of the user that can include such items as name, age, address, employer, employer's address, spouse, names and ages of children, job title, current salary and other information related to house hunting using the AV. Other personal information can be provided by one or more of the third party computer systems 114, for example one or more social media websites.

There can be various technical advantages associated with the systems and method described herein. For example, organization server computer 108 can be optimized using the house search processing engine 110 to create an optimized list of houses for the customer to view and to create an optimal route using the AV from a current location of the customer to each of the houses on the optimized list of houses. This allows the house search processing engine 110 to perform more efficiently to handle many house search requests with less computing power and in a shorter amount of time. This can result in an overall system that is faster, uses less computing power and is able to handle an increased number of house search requests.

Figure 2:
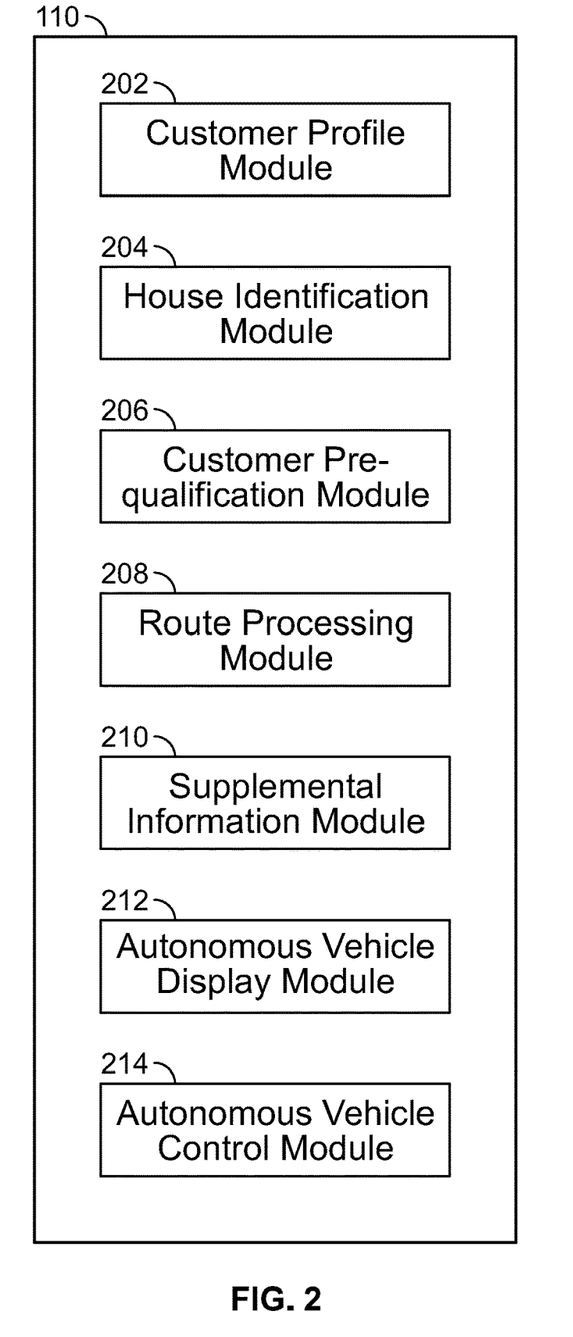
FIG. 2 show example modules of the house search processing engine of FIG. 1.

FIG. 2 shows example modules of the house search processing engine 110. The example house search processing engine 110 includes a customer profile module 202, a house identification module 204, a customer prequalification module 206, a route processing module 208, a supplemental information module 210, an autonomous vehicle display module 212 and an autonomous vehicle control module 214. More, fewer or different modules are possible.

The example customer profile module 202 stores information for profile information for the customer regarding house hunting. Example profile information can include a preferred style of house, a required number of rooms, a price range, a preferred city and a preferred neighborhood. In some implementations, the customer profile module can include personal information such as the names and ages of the customer and the customer's family members, the customer's employer and current salary, the employer and current salary of the spouse of the customer and other personal information. Other profile information is possible.

The example house identification module 204 can identify houses that that customer may be interested in purchasing based on the profile information for the customer. The house identification module can access database 112 or a third party computer system 114 for information regarding current houses for sale.

The example customer prequalification module 206 can access the customer profile module 202 and one or more third party computer systems 114 to obtain personal and financial information regarding the customer. The customer prequalification module 206 can use the personal and financial information regarding the customer to prequalify the customer to purchase houses identified by the house identification module 204. The prequalified houses can be identified on a listing of available houses than can be displayed on the electronic computing device of the customer or on a display screen in the AV.

The example route processing module 208 can determine an optimal route from a current location of the AV to each of the houses that can be identified for viewing by the customer. The optimal route can be a route that provides a shortest distance, a shortest time or most efficient route to the houses identified for viewing.

The customer can select houses for viewing from the electronic computing device of the customer or from the display screen in the AV. When the customer is not in the AV and selects the houses to be viewed from the electronic computing device of the customer, the AV can be directed to the current location of the customer and the route processing module 208 can determine the optimal route from the current location of the customer.

The current location of the customer can be a current geolocation for the customer that can be obtained from global positioning system (GPS) software on the electronic computing device of the customer. The current location of the AV can be a current geolocation of the AV that can be obtained from GPS software on an electronic computing device in the AV.

The example supplemental information module 210 can be used to obtain supplemental information regarding the houses identified for viewing by the customer and regarding houses along the optimal route to the houses identified for viewing by the customer. The supplemental information can be obtained from one or more of the third party computer systems 114 and can include such items as prices of houses near the first house on the optimal route, information regarding the neighborhood in which the first house is located, information regarding schools, crime, parks, transportation, noise levels and other information regarding the first house on the optimal route. Other supplemental information is possible. In addition, some of the supplemental information can be obtained by the AV. For example, the AV can gather noise levels of the neighborhood in which a house is located, and for an area around the house, as the AV drives through the neighborhood.

The example autonomous vehicle display module 212 controls a display device in the AV and can provide information such as a listing of houses for the customer to view and an optimal route to the houses on the display device. The listing of houses can also include an icon or another type of marker that can identify the houses on the listing of houses that the user is prequalified to purchase. The display device can be a display screen that is built into the AV. In some implementations, the display device can be implemented on one or more windows of the AV, including the windshield of the AV. The display screen can be a touch screen, permitting the user to select items on the display. In addition, when the display screen is implemented on the one or more windows of the AV, the customer can use hand motions to scroll a listing of the houses up or down on the one or more windows.

The example autonomous vehicle control module 214 can control the operation of the AV. When a customer decides to go house hunting using an AV, the customer can request the AV from the organization that organized the house hunting. The request can include a current geolocation of the customer. The autonomous vehicle control module 214 can then direct the AV to the current geolocation of the customer. After the customer enters the AV, the autonomous vehicle control module 214 can direct the AV to the first house on the optimal route. In some implementations, the AV can direct itself to the first house on the optimal route based on a command from the customer. For example, the customer can issue a voice command or the customer can select the first house on the display device in the AV to direct the AV to the first house.

When the AV arrives at a geolocation of the first house on the optimal route, the customer can get out of the AV and investigate the first house. When the customer returns to the AV, the customer can use a command to resume the AV on the optimal route. The AV can then be directed to a second house on the optimal route. This process can continue for all houses on the optimal route. The autonomous vehicle control module 214 can then return the customer to a drop off location, for example the customer's home. The command used by the customer can be a voice command or a command initiated by touching an area on the display screen in the AV.

Figure 3:
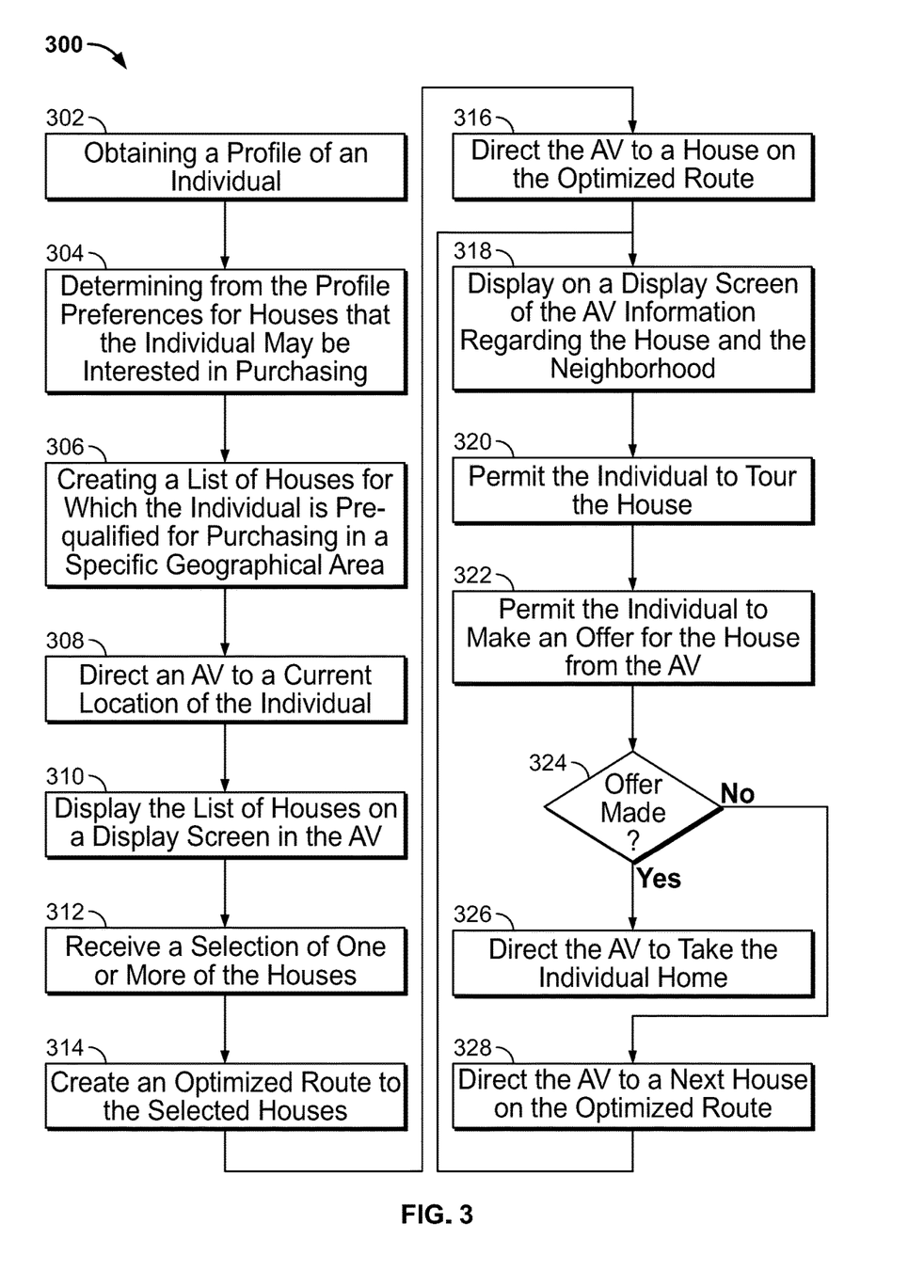
FIG. 3 shows an example method for using the autonomous vehicle for house hunting.

FIG. 3 shows a flowchart for an example method 300 for using an AV for house hunting. For this method, an individual obtains the AV from a realty company. The realty company maintains a profile of the individual including housing preferences and personal information. The housing preferences can include such items as a preferred style for a house, a preferred number of bedrooms, preferred features of a house, a preferred geographical area and neighborhood for the house and an acceptable price range for the house. The personal information can include such items as name and age of the individual, the individual's spouse and children, employment and salary information for the individual and credit ratings for the individual and the individual's spouse. With permission from the individual, the realty company can also obtain personal information from a financial institution with which the individual has a financial account and from third party organizations such as credit bureaus.

At operation 302, profile information for the individual is obtained. The profile information can be obtained from a server computer of the realty company, for example from organization server computer 108 and from one or more third party computer systems 114. As discussed, the profile information can include housing preferences and personal information.

At operation 304, preferences are identified from the profile for houses that the individual may be interested in purchasing. As discussed, the preferences can include such items as style and price range of house and geographical area and neighborhood of house.

At operation 306, the realty company creates a list of houses for which the individual may be interested in purchasing. One or more houses on the list are houses for which the individual is prequalified to purchase. The realty company can use the financial information obtained from the profile of the individual and any additional financial information that can be obtained from one or more of the third party computer systems 114 to determine whether the individual can be prequalified to purchase a house on the list. The list is created based on the housing preferences of the individual obtained from the profile of the individual.

At operation 308, an AV is directed to a current location of the individual. In some implementations, the realty company can maintain its own set of AVs for house hunting purposes. In other implementations, the realty company can have an arrangement with a third party company, such as a ride share service or a car rental company, and can obtain the AV from the third party company. The current location of the individual can be obtained from a global positioning system (GPS) software application running on a smartphone of the individual.

At operation 310, the list of houses that the individual may be interested in purchasing is displayed on a display screen in the AV. In some implementations, the display screen is a touch screen built into the AV. In other implementations, the display screen is embedded in one or more windows of the AV.

When the display screen is the touch screen, the individual can use one or more fingers to scroll through the list of houses displayed on the display screen. The individual can select one or more of the houses by touching an appropriate line of the listing on the display screen. When the display screen is embedded into the one or more windows of the AV, the individual can use hand gestures to scroll through the listing on the display screen. For example, the individual can gesture up to scroll the listing up and the individual can gesture down to scroll the listing down.

At operation 312, a selection of one or more houses is received at organization server computer 108. The selection corresponds to selections by the individual of houses to visit from the list of houses on the display screen.

At operation 314, organization server computer 108 creates an optimized route from the current location of the individual to the houses selected by the individual to visit. The optimized route comprises a route can be take the AV from the current location of the individual to each of the selected houses in a most efficient manner. Thus, the houses that are closest to the individual are first on the optimized route. The optimized route also considers traffic and road construction to provide a route that can be optimized for time and for distance.

At operation 316, the AV is directed to a location of a first house on the optimized route. Organization server computer 108 can obtain a GPS location of the first house and program the AV to travel to the GPS location of the first house.

At operation 318, as the AV travels to the first house, information about the first house, the neighborhood of the first house and other houses along the optimal route to the first house are displayed on the display screen of the AV. For example, when the display screen is embedded on a window of the AV, the window can display current market prices of one or more houses along the optimal route. The houses can be displayed translucently so that a price of a house can be displayed over the actual house as viewed through the window. Organization server computer can obtain the current market prices from a third party computer system 114, for example from Zillow. More details regarding the information that can be displayed is provided later herein with respect to FIG. 4.

At operation 320, when the AV arrives at the first house, the individual is permitted to leave the AV and tour the first house.

At operation 322, the individual is permitted to make an offer for the first house from the display screen on the AV. For example, when the individual is prequalified for the first house, when the individual clicks on the first house, a dialog box can be displayed from which the individual can enter an offer price for the first house.

At operation 324, a determination is made as to whether an offer has been made. When a determination is made that the offer has been made, at operation 326, the AV is directed to take the individual home. In another example implementation, instead of the AV being directed to take the individual home when an offer is made, the user may want to continue viewing other homes. In this case, the AV can be directed to take the individual to a next house on the optimized list, per operation 328.

At operation 324, when a determination is made that an offer has not been made, at operation 328, the AV is directed to a next house on the optimized list. Operations 318-324 are then repeated until either an offer is made or all houses on the optimized route have been visited. When an offer is made or when all houses on the optimized route have been visited, control returns to operation 326 where the AV is directed to take the individual home.

Figure 4:
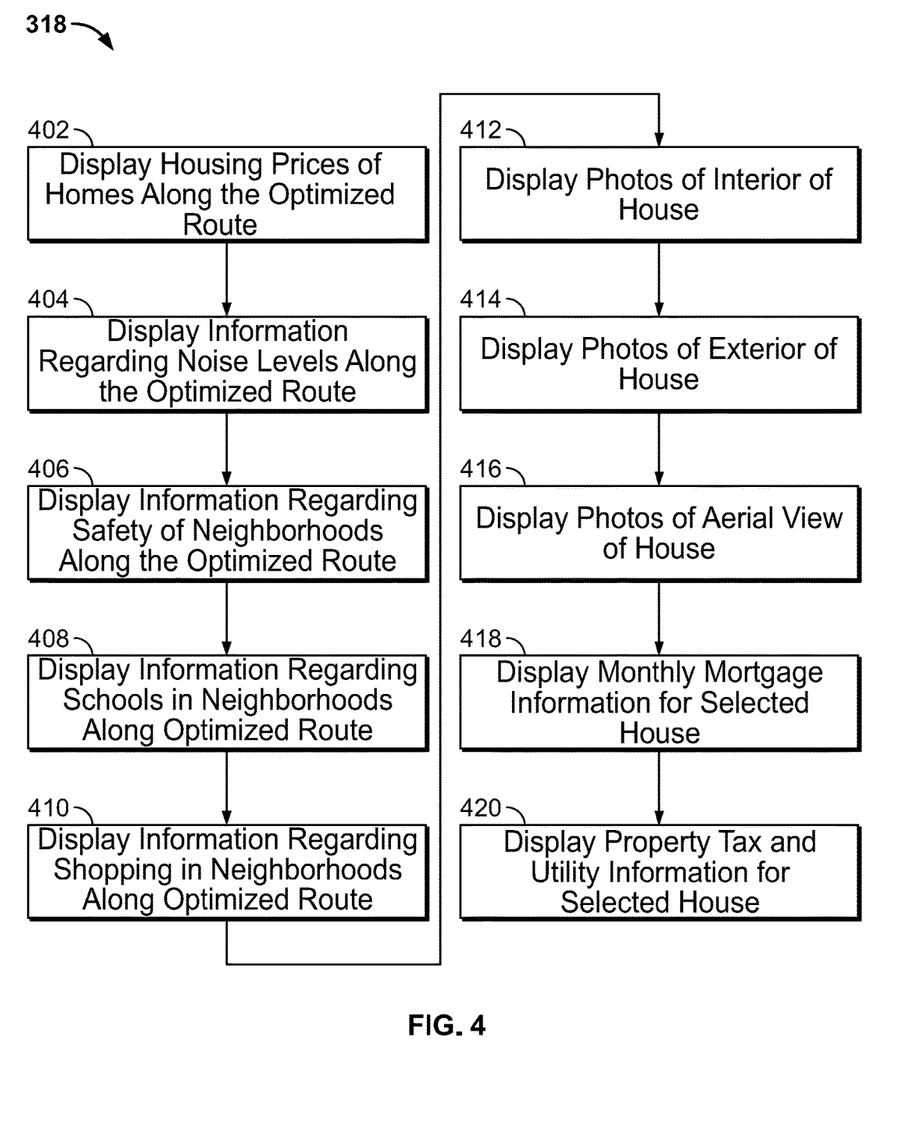
FIG. 4 shows an example operation for the method of FIG. 4.

FIG. 4 shows a flowchart for the example operation 318 for displaying on the display screen of the AV information regarding the house and the neighborhood. Operations shown in FIG. 4 are example operations. More, fewer, or different operations are possible. In addition, the sequence of the operations shown is an example sequence. Other sequences are possible.

At operation 402, prices of houses along the optimized route are displayed on a window of the AV. In an example implementation, as the AV passes a house along the optimized route, a price of the house can be displayed over the house as the house is viewed by the individual through the window. The price can reflect a current market price of the house as obtained from a third party computer system 114. The current market price of the house can be based on historical sales prices and dates.

At operation 404, information regarding noise levels along the optimized route can be displayed on the display screen in the AV. In some implementations, the AV can be configured with a noise meter or some other noise sensing device. Data from the noise meter or other noise sensing device can be displayed on the display screen. In other implementations, the noise information can be obtained from one or more of the third party computer systems 114, for example from a website that has information regarding noise levels. For example, a website for the city in which the optimized route is located can contain information regarding noise levels.

At operation 406, information regarding the safety of neighborhoods along the optimized route is displayed on the display screen in the AV. The information can include such items as crime rates, a listing of specific crimes committed in a neighborhood, a highlight of selected crimes and a summary assessment of the safety of the neighborhood. In some implementations, an icon or control for crime can be displayed on the display screen in the AV and the individual can obtain the information regarding the safety of the neighborhood by touching or otherwise selecting the icon or control.

At operation 408, information regarding schools neighborhoods along the optimized route is displayed on the display screen in the AV. The information can be displayed as a summary indicating schools available in a neighborhood. In some implementations, an icon or control for schools can be displayed on the display screen in the AV and the individual can obtain the information regarding the schools by touching or otherwise selecting the appropriate icon or control.

At operation 410, information regarding shopping in neighborhoods along the optimized route is displayed on the display screen in the AV. The information can be displayed as a summary indicating shopping available in a neighborhood. In some implementations, an icon or control for shopping can be displayed on the display screen in the AV and the individual can obtain the information regarding the shopping by touching or otherwise selecting the appropriate icon or control.

At operation 412, when the AV, photos of the interior of the house can be displayed on the display screen of the AV. The information regarding the interior of the house can be obtained from the realty company (for example from organization server computer 108) or from one of the third party computer systems 114, for example from a social networking website. The photos of the interior of the house can typically be displayed by touching or otherwise selecting an icon for photos of the house. In some implementations, the icon or control for the photos is displayed when the AV arrives at the geolocation of the house. In other implementations, the icon or control for photos can be displayed at any time during the optimal route. The individual can then select a specific house for which interior photos is available.

At operation 414, photos of the exterior of the house can be displayed on the display screen of the AV. The photos of the exterior of the house can be obtained from the realty company or from one of the third party computer systems 114. Similar to the interior photos, the exterior photos can be selected from an icon or control on the display screen of the AV.

At operation 416, photos of an aerial view of the house can be displayed on the display screen of the AV. In some implementations, the photos of the aerial view can be obtained from the realty company for from a third party website. In other implementations, the aerial view can be taken by a drone device that can be mounted to the roof or some other area of the AV and that can be dispatched to take one or more aerial photos of the house when the AV arrives at the house. The photos of the aerial view of the house can also include a photo of the roof of the house.

At operation 418, when the AV arrives at the house, mortgage information regarding the house can be displayed on the display screen of the AV. The mortgage information can include an estimated monthly payment based on a percent of the market value of the house that is estimated to be financed by a mortgage. The monthly mortgage payment can be shown both for 15-year and 30-year mortgages. When an offer is made, the mortgage payment information can be adjusted based on the amount of the offer and an indication by the individual as to the amount of the offer that is to be financed. As for the other information being displayed, the mortgage information can be displayed by touching or pointing to an appropriate icon or control on the display screen.

At operation 420, property tax and utility information for the house can be displayed on the display screen of the AV. The property tax and utility information can be displayed by touching or pointing to an appropriate icon or control on the display screen.

Figure 5:
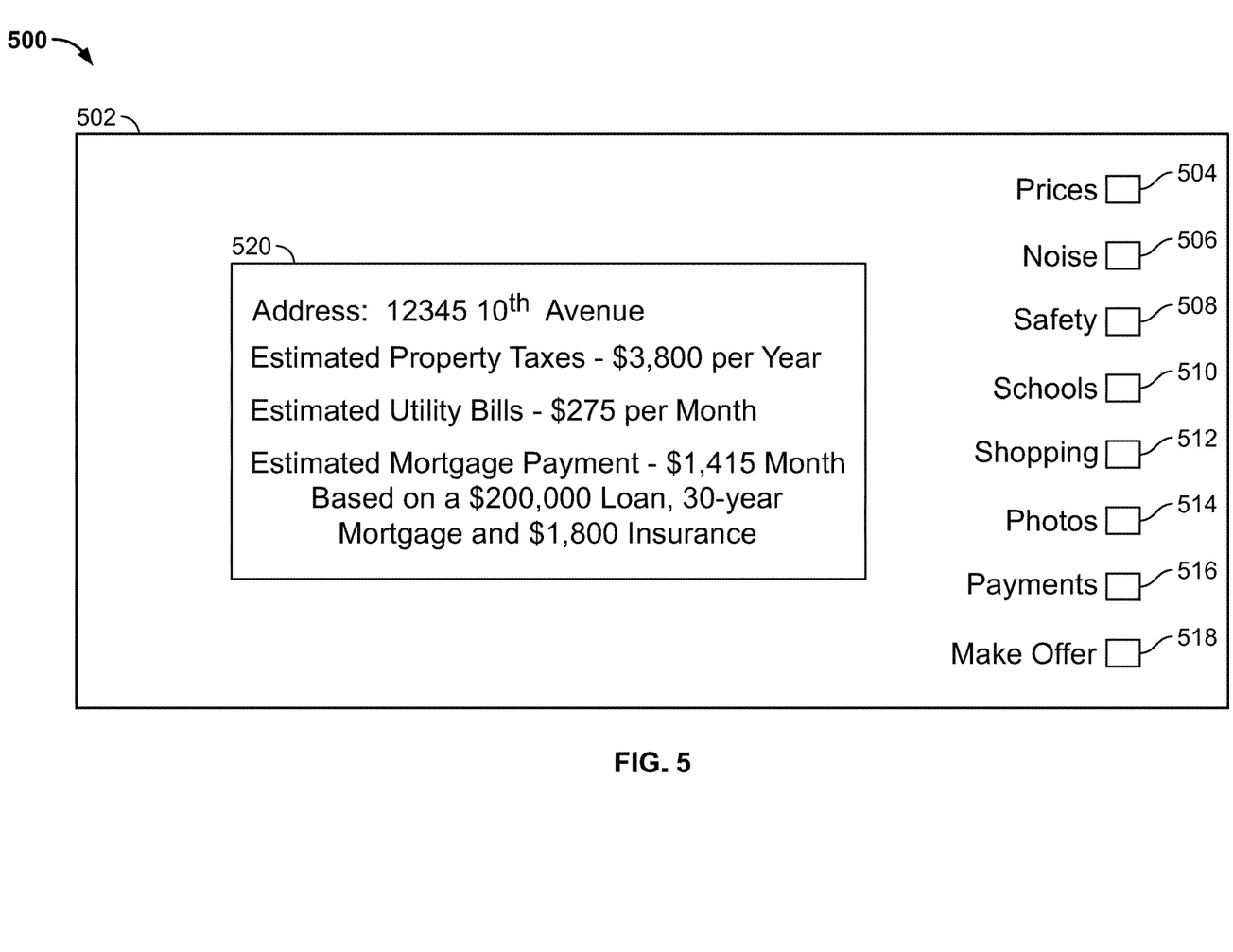
FIG. 5 shows an example user interface that can be implemented on a display screen in the autonomous vehicle.

FIG. 5 shows an example user interface an example display screen 500 that can be implemented in the AV. The display screen 500 can be implemented on a display screen unit in the AV or can be implemented in a window of the AV.

The display screen 500 includes a main display area 502 that can display a plurality of items, as discussed with regard to FIG. 4 and as discussed further next herein. When the display screen 500 is implemented in the AV window, the main display area 502 can be an actual glass window of the AV upon which additional information can be projected or displayed.

The display screen 500 also includes a plurality of example icons (504-518) that can be used to display additional information and to make an offer for a house. FIG. 5 also shows an example payments display summary 520, as explained later herein.

When example prices icon 504 is selected, the individual can choose to have prices of homes along the optimized route displayed in main display area 502 or the individual can choose to display a price for a specific house. For example, when the individual chooses to display home prices along the optimized route, when the display screen is a display screen included in a display unit of the AV, main display area can show a map of the optimized display area with prices shown for houses at locations shown on the map. When the display screen is embedded in a window of the AV, prices of houses can be projected or displayed on the window of the AV as the AV passes by the houses. The houses and the projected prices can be viewed by the individual through the window of the AV. When he individual chooses to display a price for a specific house, the user can select the house from a menu of houses on the optimized route and the current market price of the house can be displayed in main display area 502.

When example noise icon 506 is selected, noise information regarding the neighborhood that the AV is passing through can be displayed in main display area 502. The noise information can be obtained from a noise sensor included with the AV or the noise information can be obtained from one of third party computer systems 114. In some implementations, when noise icon 506 is selected a dialog box can permit the individual to select a display of noise levels at a specific house, for example for the first house on the optimized route. When a selection is made to display noise levels for a specific house, the noise level information can be obtained from one of third party computer systems 114.

When example safety icon 508 is selected, crime information, as discussed earlier herein, can be displayed in main display area 502. The crime information can be displayed based on a neighborhood at which the AV is currently passing through or the crime information can be displayed for a specific house. The crime information can be obtained from one or more of third party computer systems 114.

When schools icon 510 is selected, information about schools in the neighborhood at which the AV is currently passing through or in a neighborhood of a specific house can be displayed in main display area 502. The school information can be obtained from one or more of third party computer systems 114.

When shopping icon 512 is selected, information about shopping schools in the neighborhood at which the AV is currently passing through or in a neighborhood of a specific house can be displayed in main display area 502. The shopping information can be obtained from one or more of third party computer systems 114.

When photos icon 514 is selected, the individual can select a house and can choose to have photos displayed of the interior or exterior of the house or of an aerial view of the house.

When payments icon 516 is selected, the individual can choose to display estimated mortgage payments for a specific house and estimated property taxes and utility bills for the house, as discussed earlier herein. In addition, when the individual makes an offer for the specific house, the individual can enter the offer price and an estimated down payment amount. The estimated mortgage payments can be updated based on the offer price and the down payment amount.

FIG. 5 shows an example payments summary 520 that can be displayed when payments icon 516 is selected. The payments summary 520 shows that for a house at 12345 $10^{th}$ avenue, the estimated property taxes are $3,800 per year, the estimated utility bills (including gas and electricity) are $275 per month and the estimated mortgage payment is $1,415 per month, based on a $200,000 loan, a 30-year mortgage, monthly property tax payments and $1,800 annual insurance on the house. Other information can be displayed in display area 520 when another of icons 504-518 is selected. As shown in FIG. 5, the display screen 500 can be implemented on a window of the AV, for example the windshield of the AV. When the display screen is the windshield of the AV, the payments summary 520 can be projected on the windshield of the AV. When icon 518 is selected, the individual can make an offer for a specific house. A dialog box or a new user interface screen can be activated that can permit individual to enter the offer price.

Figure 6:
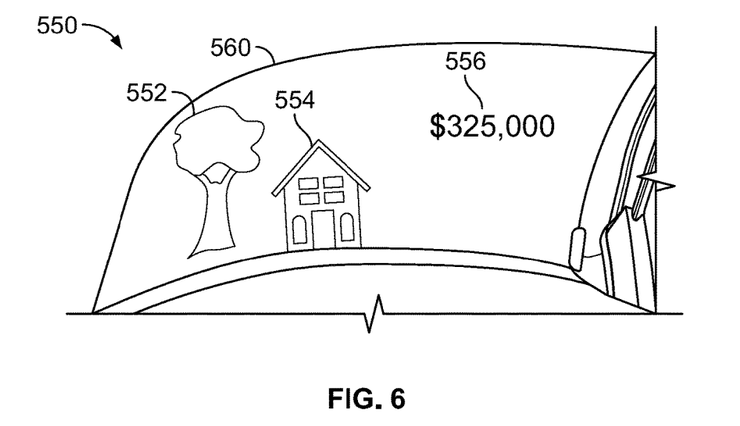
FIG. 6 shows an example augmented reality display that can be implemented on a window of the autonomous vehicle.

FIG. 6 shows an example augmented reality display that can be implemented on a window of the AV. FIG. 6 shows a window 560 of an AV 550. For the example shown in FIG. 6, the window 560 of the AV 550 is a side window of the AV 550 (for example the left rear side window). When the individual looks out of the window 560, the individual can view a tree 552 and a house 554 of a particular property through the window of the AV. When the individual selects the prices 504 icon, a current market price 556 of the house can be projected on the window 560 as an augmented reality overlay. As shown in FIG. 6, the current market price of the house 554 is $325,000. Current market prices of other houses can be displayed on the window of the AV in a similar manner as the AV passes the other houses.

Figure 7:
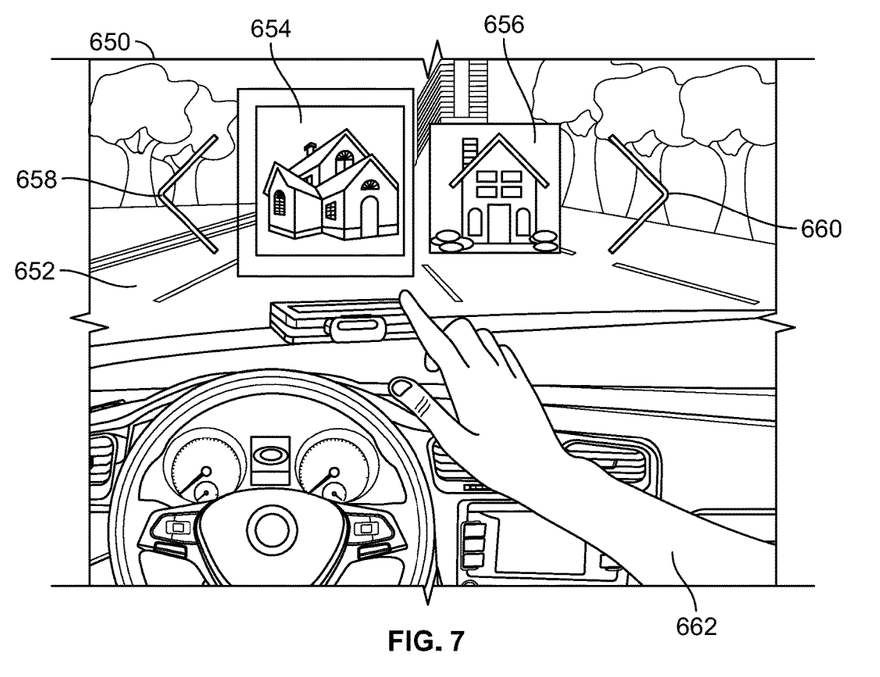
FIG. 7 shows another example augmented reality display than can be implemented on a window of the autonomous vehicle.

FIG. 7 shows another example augmented reality display that can be implemented on a window of the AV. FIG. 7 shows a view from an interior of an AV 650. The AV 650 includes a windshield 652. As shown in FIG. 7, example images of houses 654 and 656 can be projected in augmented reality on the windshield 652. For example, house 654 can be an image of one house on a list of houses for the individual to view and house 656 can be a next house on the list of houses. In addition to the images of the houses, example arrows 658 and 660 are projected on the windshield 652. The individual can use their hand 652 to scroll from one house to another. For example, the individual can select arrow 660 to select the next house and highlight house 656. Similarly, the individual can select arrow 558 to select a previous house on the list of house or to select house 654 when house 656 is highlighted. In another implementation, the individual can swipe left or right rather than select arrows 658 and 660, respectively.

In addition to displaying images of houses on a list of houses on a window of the AV, the individual can also display different types of augmented reality views. For example, when the user arrives at a property, the user can project in an augmented reality view an image of a modified view of the specific house. For example, the individual can project an augmented reality view of the specific house in a different color or with a different type of siding. The individual can also project an augmented reality view of changes in features to the house, for example projecting an image of how the house would look with a different garage door or with an additional room. Other images related to the specific house can be projected on the windshield or another window of the AV.

Figure 8:
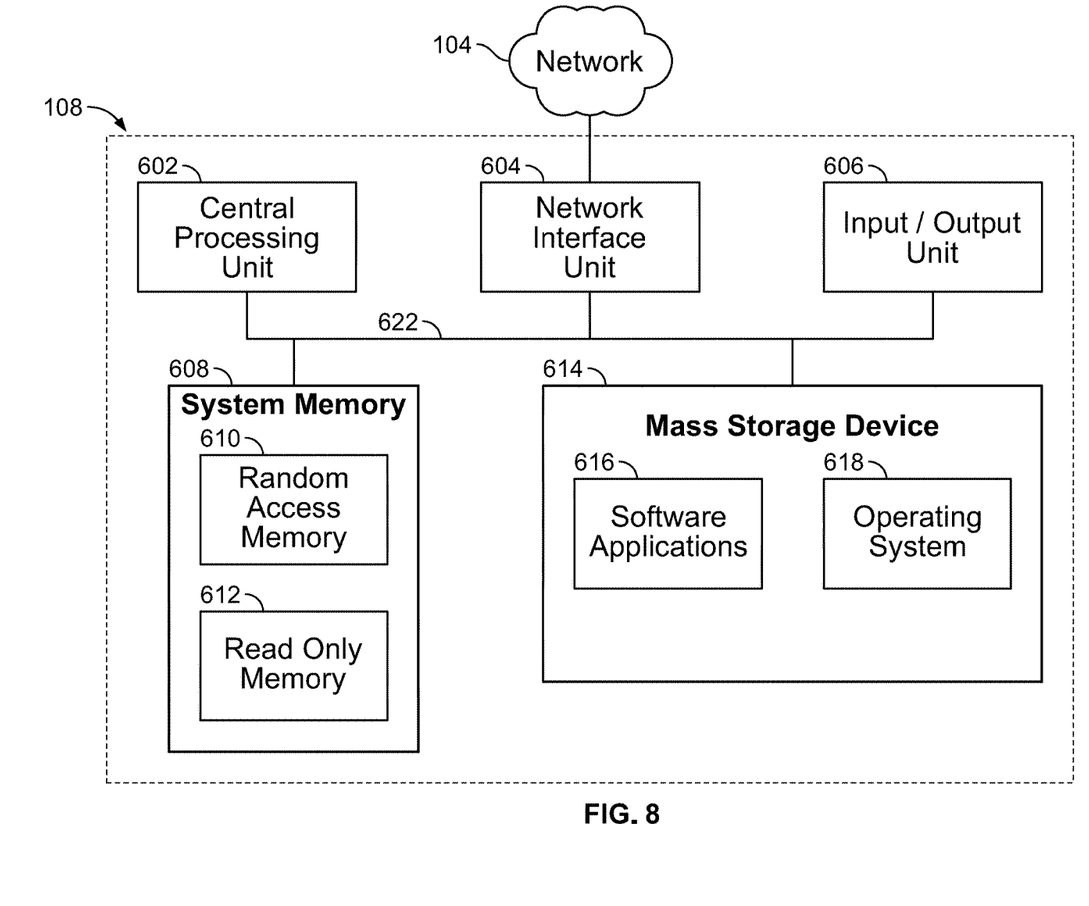
FIG. 8 shows example physical components of the organization server computer of FIG. 1.

As illustrated in the example of FIG. 8, organization server computer 108 includes at least one central processing unit ("CPU") 602, also referred to as a processor, a system memory 608, and a system bus 622 that couples the system memory 608 to the CPU 602. The system memory 608 includes a random access memory ("RAM") 610 and a read-only memory ("ROM") 612. A basic input/output system that contains the basic routines that help to transfer information between elements within the organization server computer 108, such as during startup, is stored in the ROM 612. The organization server computer 108 further includes a mass storage device 614. The mass storage device 614 is able to store software instructions and data. Some or all of the components of the organization server computer 108 can also be included in customer computing device 102.

The mass storage device 614 is connected to the CPU 602 through a mass storage controller (not shown) connected to the system bus 622. The mass storage device 614 and its associated computer-readable data storage media provide non-volatile, non-transitory storage for the organization server computer 108. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the organization server computer 108.

According to various embodiments of the invention, the organization server computer 108 may operate in a networked environment using logical connections to remote network devices through the network 104, such as a wireless network, the Internet, or another type of network. The organization server computer 108 may connect to the network 104 through a network interface unit 604 connected to the system bus 622. It should be appreciated that the network interface unit 604 may also be utilized to connect to other types of networks and remote computing systems. The organization server computer 108 also includes an input/output controller 606 for receiving and processing input from a number of other devices, including a touch user interface display screen, or another type of input device. Similarly, the input/output controller 606 may provide output to a touch user interface display screen or other type of output device.

As mentioned briefly above, the mass storage device 614 and the RAM 610 of the organization server computer 108 can store software instructions and data. The software instructions include an operating system 618 suitable for controlling the operation of the organization server computer 108. The mass storage device 614 and/or the RAM 610 also store software instructions and software applications 616, that when executed by the CPU 602, cause the organization server computer 108 to provide the functionality of the organization server computer 108 discussed in this document. For example, the mass storage device 614 and/or the RAM 610 can store software instructions that, when executed by the CPU 602, cause the organization server computer 108 to display received data on the display screen of the organization server computer 108.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented in an autonomous vehicle (AV) for facilitating house hunting using the AV, the method comprising:
   displaying on a window of the AV, a listing of one or more houses for sale in a specific geographical area;
   receiving a selection of one or more houses from the listing of the one or more houses for which an individual is prequalified to purchase;
   identifying an optimized route from a current geolocation of the AV to a geolocation of each of the one or more houses selected, the optimized route being a route that is the shortest route to the one or more houses selected or a route that is a fastest route to the one or more houses selected;
   automatically directing the AV to drive to the geolocation of a first house on the optimized route;
   as the AV is driving to the geolocation of the first house, display on the window of the AV one or more of 1) information regarding noise levels along the optimized route, 2) information regarding crime in a neighborhood along the optimized route, 3) information regarding schools in the neighborhood along the optimized route, 4) information regarding transportation in the neighborhood along the optimized route and 5) information regarding shopping in the neighborhood along the optimized route; and
   when the AV reaches the geolocation of the first house:
      display on the window of the AV a view of an interior of the first house;
      display on the window of the AV a current price of the first house, a current market value of the first house and a current annual property tax for the first house; and
      display on the window of the AV an estimated monthly mortgage,
   insurance and property tax payment for the first house.

2. The method of claim 1, wherein the display screen is implemented on one or more windows of the AV.

3. The method of claim 2, further comprising permitting a user to scroll through the listing of one or more houses via using one or more hand actions on one of the windows of the AV.

4. The method of claim 1, further comprising prequalifying one or more houses in the listing of one or more houses for purchase by an individual riding in the AV.

5. The method of claim 1, further comprising identifying each house that is prequalified for purchase by the individual by displaying an icon adjacent to the each house on the listing of the one or more houses for sale.

6. The method of claim 1, further comprising: while the AV is driving to the geolocation of the first house, displaying on the display screen of the AV estimated prices of the one or more houses along the route.

7. The method of claim 6, wherein an estimated price of each of the one or more houses along the route is displayed on a window of the AV as the AV reaches the geolocation of the each of one or more houses along the route.

8. The method of claim 1, further comprising: when the AV reaches the geolocation of the first house:
receiving an image of a roof of the first house from a drone device associated with the AV; and
displaying the image of the roof of the first house on the display screen of the AV.

9. The method of claim 1, further comprising: when the AV reaches the geolocation of the first house, displaying on the display screen a value indicating a noise level at the geolocation of the first house.

10. The method of claim 1, further comprising: after the AV reaches the geolocation of the first house on the route, receiving a command from an individual to direct the AV to a geolocation of a second house that is next in the route.

11. A method implemented in an autonomous vehicle (AV) for facilitating house hunting using the AV, the method comprising:
displaying on a window of the AV, a listing of houses in a specific geographical area available for sale;
receiving a selection of one or more houses from the listing of houses for which the individual is prequalified to purchase;
identifying an optimized route from a current geolocation of the AV to a geolocation of each of the one or more houses selected, the optimized route being a route that is the shortest route to the one or more houses selected or a route that is a fastest route to the one or more houses selected;
automatically directing the AV to drive to the geolocation of a first house on the optimized route;
as the AV is driving to the geolocation of the first house, display on the display screen of the AV one or more of 1) information regarding noise levels along the optimized route, 2) information regarding crime in a neighborhood along the optimized route, 3) information regarding schools in the neighborhood along the optimized route, 4) information regarding transportation in the neighborhood along the optimized route and 5) information regarding shopping in the neighborhood along the optimized route; and
when the AV reaches the geolocation of the first house:
display on the window of the AV a view of an interior of the first house;
display on the window of the AV a current price of the first house, a current market value of the first house and a current annual property tax for the first house; and
display on the window of the AV an estimated monthly mortgage, insurance and property tax payment for the first house; and
after reaching the geolocation of the first house, upon a command of an individual in the AV, directing the AV to drive to the geolocation of a second house that is next on the optimized route.

12. The method of claim 11, further comprising:
prequalifying for the individual one or more houses from the listing of houses; and
displaying on the listing of houses an icon adjacent to each of the one or more houses that are prequalified for the individual.

13. The method of claim 11, further comprising: while the AV is driving to the geolocation of the first house, displaying on the window of the AV an estimated price of one or more houses along the optimized route.

14. An electronic computing device implemented in an autonomous vehicle (AV), comprising:
a processor; and
system memory, the system memory including instructions which, when executed by the processor, cause the electronic computing device to:
display on a display screen of the AV, a listing of houses in a specific geographical area available for sale, the display screen being implemented on one or more windows of the AV;
receive information identifying one or more houses on the listing of houses for which an individual is prequalified to purchase;
display on the display screen of the AV, an icon adjacent to each of the one or more houses on the listing of houses for which the individual is prequalified to purchase;
receive a selection of one or more of houses on the listing of houses for which the individual is prequalified to purchase;
identify an optimized route from a current geolocation of the AV to a geolocation of each of the one or more houses selected, the optimized route being a route that is a shortest route to the one or more houses selected or a route that that is a fastest route to the one or more houses selected;
automatically direct the AV to drive to the geolocation of a first house on the optimized route;
as the AV is driving to the geolocation of the first house, display on the display screen of the AV one or more of 1) information regarding noise levels along the optimized route, 2) information regarding crime in a neighborhood along the optimized route, 3) information regarding schools in the neighborhood along the optimized route, 4) information regarding transportation in the neighborhood along the optimized route and 5) information regarding shopping in the neighborhood along the optimized route; and
when the AV reaches the geolocation of the first house:
display on the display screen of the AV a view of an interior of the first house;
display on the display screen of the AV a current price of the first house, a current market value of the first house and a current annual property tax for the first house; and
display on the display screen of the AV an estimated monthly mortgage, insurance and property tax payment for the first house.

* * * * *